(12) United States Patent
DeCamp et al.

(10) Patent No.: US 6,377,871 B1
(45) Date of Patent: Apr. 23, 2002

(54) INTEGRATED DIE CAST

(75) Inventors: William H. DeCamp, Cincinnati; Alan G. Livingston, Riverside; Scott D. Colwell, Kettering, all of OH (US)

(73) Assignee: Motoman, Inc., West Carrollton, OH (US)

( * ) Notice: Subject to any disclaimer, the term of this patent is extended or adjusted under 35 U.S.C. 154(b) by 0 days.

(21) Appl. No.: 09/697,751

(22) Filed: Oct. 26, 2000

Related U.S. Application Data

(60) Provisional application No. 60/163,041, filed on Nov. 2, 1999, and provisional application No. 60/161,569, filed on Oct. 26, 1999.

(51) Int. Cl.$^7$ .............................................. G06F 19/00
(52) U.S. Cl. ........................ 700/245; 700/96; 700/97; 700/165; 700/245; 700/247; 700/264; 72/16.2; 72/37; 72/380; 72/420; 72/422; 706/13; 706/62; 901/3
(58) Field of Search ........................... 700/96, 97, 165, 700/245, 255, 178, 264, 180, 247, 100, 107; 72/16.2, 37, 420, 422, 380, 389.5, 379.2; 706/13, 62; 901/3

(56) References Cited

U.S. PATENT DOCUMENTS

| | | |
|---|---|---|
| 3,270,379 A | 9/1966 | Sehn et al. |
| 3,765,474 A | 10/1973 | Burton |
| 4,094,055 A | 6/1978 | Morimoto |

(List continued on next page.)

OTHER PUBLICATIONS

Lorenz et al., A structured automated design procedure for systems integration sequentaal logic, 1988, IEEE, pp. 1420–1424.*

Wilkinson et al., Computer control of pressure die–casting, 1991, IEEE, pp. 18–22.*

(List continued on next page.)

*Primary Examiner*—William A. Cuchlinski, Jr.
*Assistant Examiner*—Marc L McDieunel
(74) *Attorney, Agent, or Firm*—Killworth, Gottman, Hagan & Schaeff LLP

(57) ABSTRACT

An integrated die cast system is provided comprising a die casting machine, a servo-controlled ladle, a servo-controlled sprayer, a pick and place robot, an integrated controller, and a programming pendant. The die casting machine includes a die casting machine controller. The servo-controlled ladle includes a molten material ladle and a servo-motor arranged to cause the ladle to transfer molten material to an injection chamber of the die casting machine. The servo-controlled sprayer includes a sprayer assembly and a servo-motor arranged to orient the sprayer assembly proximate a die cavity of the die casting machine. The pick and place robot is arranged to access a die cavity of the die casting machine. The integrated controller is in communication with the die-casting machine controller, the servo-controlled ladle, the servo-controlled sprayer, and the pick and place robot. The integrated controller is programmed to (i) execute operational parameters of the servo-controlled ladle, (ii) execute operational parameters of the servo-controlled sprayer, (iii) execute operational parameters of the pick and place robot, (iv) execute a die casting operation by coordinating the operational parameters of the die casting machine, the servo-controlled ladle, the servo-controlled sprayer, and the pick and place robot. The operational parameters of the die casting machine, the servo-controlled ladle, the servo-controlled sprayer, and the pick and place robot are interdependent. The programming pendant is coupled to the integrated controller and is arranged to permit a programmer to define the operational parameters of the die casting machine, the servo-controlled ladle, the servo-controlled sprayer, and the pick and place robot.

20 Claims, 1 Drawing Sheet

U.S. PATENT DOCUMENTS

| | | | |
|---|---|---|---|
| 4,548,544 A | | 10/1985 | Appledorn |
| 4,629,409 A | | 12/1986 | Satoh et al. |
| 4,998,206 A | * | 3/1991 | Jones et al. ............. 700/96 |
| 5,150,288 A | * | 9/1992 | Imai et al. |
| 5,533,562 A | | 7/1996 | Moschini et al. |
| 5,536,318 A | | 7/1996 | Hashiuchi et al. |
| 5,662,159 A | | 9/1997 | Iwamoto et al. |
| 5,859,777 A | | 1/1999 | Yokoyama et al. |
| 5,870,305 A | | 2/1999 | Yokoyama |
| 5,887,641 A | | 3/1999 | Iwamoto et al. |
| 5,917,726 A | | 6/1999 | Pryor |
| 5,918,662 A | | 7/1999 | Tezuka et al. |
| 5,957,192 A | | 9/1999 | Kitamura et al. |
| 5,969,973 A | * | 10/1999 | Bourne et al. |
| 5,988,260 A | | 11/1999 | Iwamoto et al. |

OTHER PUBLICATIONS

L. G. Hellmann Corporation, 1987, Internet, pp. 1–5.*

MOTOMAN–ARCSYSTEM 6000, 1995, Internet pp. 1–11.*

Avance reasearch & robotics, Unimate series information, 1961, Internet, pp. 1–4.*

Zitai precision machinery co., LTD., professional cold chamber die casting machine & ancillary equipment manufacture, 2001, pp. 1–2.*

News, Pre–dengineered "World" Solution for die casting industry . . ., Nov. 11, 1999, Internet, pp. 1–2.*

Yaskwa company, MOTOMAN, (UP6, UP20, UP50, UP130 and UP165) Robot, 2001, pp. 1–14.*

* cited by examiner

INTEGRATED DIE CAST

CROSS-REFERENCE TO RELATED APPLICATIONS

This application claims the benefit of U.S. Provisional Application Serial Nos. 60/163,041, filed Nov. 2, 1999 and 60/161,569, filed Oct. 26, 1999.

BACKGROUND OF THE INVENTION

The present invention relates to a die casting process and, more particularly, to a robotic die casting arrangement including a die casting machine, a robot, an integrated robot controller, and a programming pendant. Conventional die cast arrangements often utilize excessive floor space and are difficult and expensive to program, operate, and maintain. Accordingly, there is a need for a die casting arrangement that utilizes a minimum amount of floor space, and provides for easier and more efficient programming, operation, and maintenance.

BRIEF SUMMARY OF THE INVENTION

These needs are met by the integrated die cast arrangement of the present invention wherein a programming pendant enables a user to program a specific job defining particular operations, and an integrated controller selectively executes programmed jobs by communicating with one or more components of the integrated die cast arrangement.

In accordance with one embodiment of the present invention, an integrated die cast system is provided comprising a die casting machine, a servo-controlled ladle, a servo-controlled sprayer, a pick and place robot, an integrated controller, and a programming pendant. The die casting machine includes a die casting machine controller. The servo-controlled ladle includes a molten material ladle and a servo-motor arranged to cause the ladle to transfer molten material to an injection chamber of the die casting machine. The servo-controlled sprayer includes a sprayer assembly and a servo-motor arranged to orient the sprayer assembly proximate a die cavity of the die casting machine. The pick and place robot is arranged to access a die cavity of the die casting machine. The integrated controller is in communication with the die-casting machine controller, the servo-controlled ladle, the servo-controlled sprayer, and the pick and place robot. The integrated controller is programmed to (i) execute operational parameters of the servo-controlled ladle, (ii) execute operational parameters of the servo-controlled sprayer, (iii) execute operational parameters of the pick and place robot, (iv) execute a die casting operation by coordinating the operational parameters of the die casting machine, the servo-controlled ladle, the servo-controlled sprayer, and the pick and place robot. The operational parameters of the die casting machine, the servo-controlled ladle, the servo-controlled sprayer, and the pick and place robot are interdependent. The programming pendant is coupled to the integrated controller and is arranged to permit a programmer to define the operational parameters of the die casting machine, the servo-controlled ladle, the servo-controlled sprayer, and the pick and place robot.

In accordance with another embodiment of the present invention, an integrated die cast system is provided comprising a die casting machine, a servo-controlled mechanism associated with the die casting machine, a pick and place robot, and an integrated controller. The pick and place robot associated with the die casting machine. The integrated controller is in communication with the die-casting machine, the servo controlled mechanism, and the pick and place robot. The integrated controller is programmed to (i) execute operational parameters of the servo-controlled mechanism, (ii) execute operational parameters of the pick and place robot, and (iii) execute a die casting operation by coordinating the operational parameters of the die casting machine, the servo-controlled mechanism, and the pick and place robot. The operational parameters of the die casting machine, the servo-controlled mechanism, and the pick and place robot are interdependent.

The integrated controller may be programmed to execute the die casting operation as a function of a status of the servo-controlled mechanism. The status of the servo-controlled mechanism may comprise a progressive representation of a task to be completed by the servo-controlled mechanism. The die casting operation may be executed upon completion of the task or prior to completion of the task.

The integrated controller may be programmed to (i) execute the die casting operation as a function of a status of the pick and place robot, (ii) operate the pick and place robot as a function of a status of the die casting machine, and/or (iii) operate the servo-controlled mechanism as a function of a status of the die casting machine. A programming pendant may be coupled to the integrated controller and arranged to permit a programmer to define the operational parameters of the die casting machine, the servo-controlled mechanism, and the pick and place robot.

The servo-controlled mechanism may comprise a molten material ladle and a servo-motor arranged to cause the ladle to transfer molten material to an injection chamber of the die casting machine. The servo-controlled mechanism may comprise a sprayer assembly and a servo-motor arranged to orient the sprayer assembly proximate a die cavity of the die casting machine. The servo-controlled mechanism may comprise a robot transfer track arranged to move the pick and place robot along a predetermined axis.

Accordingly, it is an object of the present invention to provide a die casting arrangement that utilizes a minimum amount of floor space, and provides for easier and more efficient programming, operation, and maintenance. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with FIG. 1, which is a schematic block diagram of an integrated die cast system according to the present invention.

DETAILED DESCRIPTION

Figure 1:
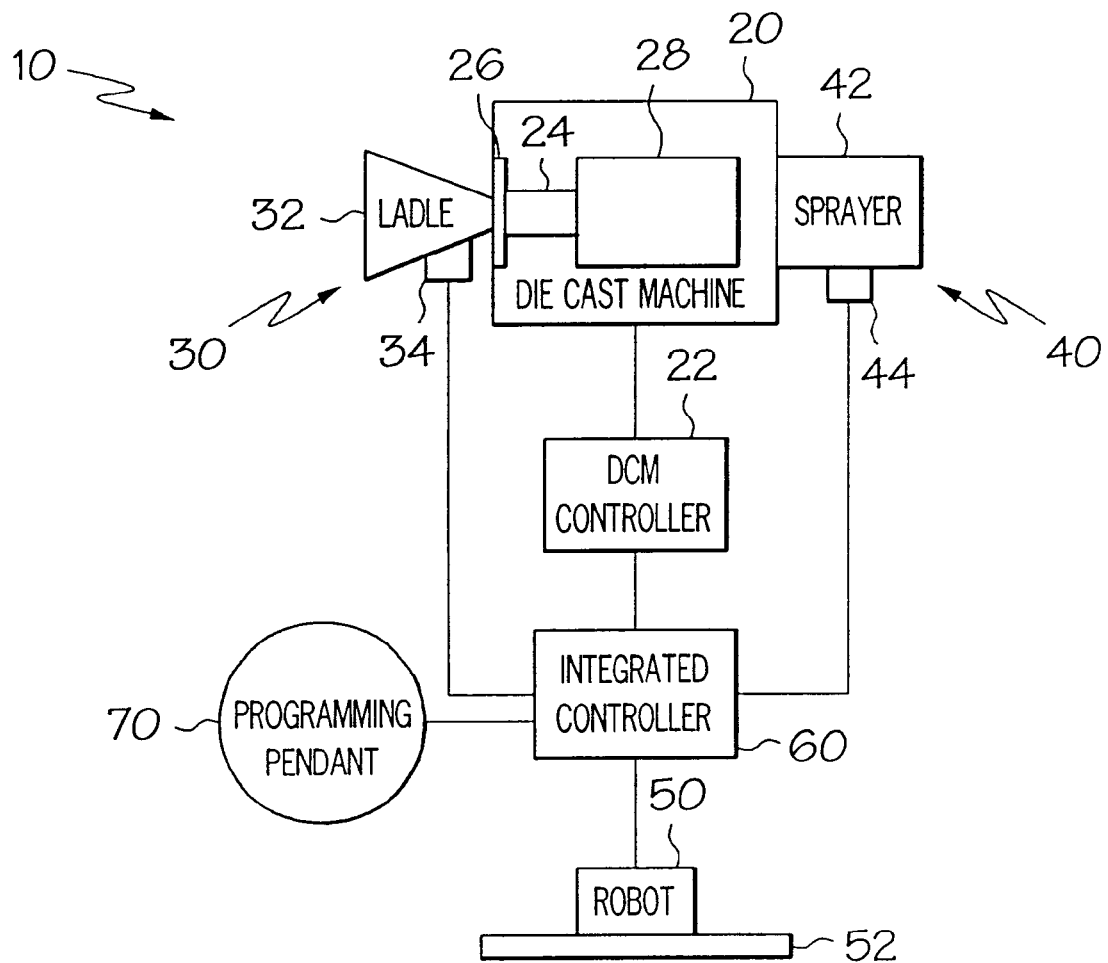

Referring to FIG. 1, an integrated die cast system 10 is provided comprising a die casting machine 20, a servo-controlled ladle 30, a servo-controlled sprayer 40, a pick and place robot 50, an integrated controller 60, and a programming pendant 70. The die casting machine 20 includes a die casting machine controller 22. For the purposes of defining and describing the present invention, a device is said to be servo-controlled if it defines an operational parameter that is subject to automatic feedback control. For example, a servo motor may be controlled to define a position of an actuator and will automatically generate an output indicative of the position defined by the motor. In this manner, the position of the actuator may be subject to automatic feedback control.

The servo-controlled ladle 30 includes a molten material ladle 32 and a servo-motor 34 arranged to cause the ladle 32 to transfer molten material to an injection chamber 24 of the die casting machine 20. An injection device 26 is provided in the form of a servo valve, injection cylinder, etc., to enable proper transfer of molten material from the injection chamber 24 to the die cavity 28. The molten material ladle 32, servo-motor 34, injection chamber 24, injection device, and die cavity 28 are merely illustrated schematically in FIG. 1 because the specific arrangement of these components is not critical to the present invention and may be gleaned from conventional teachings of die casting systems.

The servo-controlled sprayer 40 includes a sprayer assembly 42 and a servo-motor 44 arranged to orient the sprayer assembly 42 proximate the die cavity 28 of the die casting machine 20. The sprayer 40 may also be oriented proximate castings removed from the die cavity 28. For the purposes of defining and describing the present invention, it is noted that the sprayer 40 may be arranged to execute cleaning, cooling, coating, or otherwise treating surfaces of the die cavity 28 or surfaces of a die cast part. The servo-controlled sprayer 40, the sprayer assembly 42, and the servo-motor 44 are merely illustrated schematically in FIG. 1 because the specific arrangement of these components is not critical to the present invention and may be gleaned from conventional teachings of die cast systems.

The pick and place robot 50 is arranged to access the die cavity 28 of the die casting machine 20 to enable removal of a casting from the die cavity 28, positioning of the casting for further processing, and/or, placement of the die casting for trimming and packing or other processing, storage, or assembly. Any one of a number of conventional robotic devices may be utilized for these purposes. A variety of suitable general and special purpose robots are available, for example, from Motoman, Inc., West Carrollton, Ohio. According to one embodiment of the present invention, a servo-controlled robot transfer track 52 is arranged to move the pick and place robot 50 along a predetermined axis so as to add an additional degree of freedom to the movement of the pick and place robot 50.

The integrated controller 60 typically comprises a programmable logic controller and is in communication with the die-casting machine controller 22, the servo-controlled ladle 30, the servo-controlled sprayer 40, and the pick and place robot 50. The integrated controller 60 is programmed to execute a number of operations associated with the die-casting machine 20, the servo-controlled ladle 30, the servo-controlled sprayer 40, and the pick and place robot 50. For example, the integrated controller 60 is programmed to operate the servo-controlled ladle 30 by controlling and receiving feedback from the molten material ladle 32 and servo-motor 34 to effect predetermined molten material dipping and pouring operations. The integrated controller 60 is also programmed to operate the servo-controlled sprayer 40 by controlling and receiving feedback signals from the sprayer assembly 42 and the servo-motor 44 to effect predetermined spray operations. The integrated controller is also programmed to control the pick and place robot 50 to effect positioning of the casting for further processing, and/or, placement of the die casting for further processing, storage, or assembly.

The die casting machine controller 22 is in communication with the integrated controller 60 and is programmed to control selected operations of the die casting machine 20. For example, the die casting machine controller 22 is arranged to control injection of the molten material into the die cavity 28, to open, close, and secure the die cavity 28, etc. For the purposes of defining and describing the present invention, a component or device is said to be associated with another component or device if it is arranged to work in concert with or arranged to effect a condition of the associated component or device.

The integrated controller 60 is programmed to execute the die casting operation as a function of the respective statuses of the different servo-controlled mechanisms.

The status of a particular servo-controlled mechanism may comprise a progressive representation of a task to be completed by the servo-controlled mechanism. In this manner, the die casting operation, or a specific portion thereof, may be executed upon completion of the specific task, prior to completion of a specific task, upon initiation of a specific task, or at a predetermined point during execution of the task. For example, where the servo-controlled mechanism comprises a sprayer assembly, the die casting operation will typically not be executed until the spraying task is complete, or nearly complete, and the status of the sprayer assembly indicates "spray complete" or "spray nearing completion." As a further example, where the servo-controlled mechanism comprises a molten material ladle, the die casting operation will typically not be executed until the injection chamber is filled, or nearly filled, and the status of the servo-controlled ladle indicates "pour complete" or "pour nearing completion." The capacity of the present invention to enable actuation or control at specific points along the progression of a task is a direct result of the integration of the controller 60 with the die casting machine 20 and the various servo-controlled mechanisms of the integrated die cast system 10.

Typically, the integrated controller 60 will be programmed to execute the die casting operation as a function of a status of the pick and place robot 50. For example, the status of the pick and place robot may comprise an "unloading complete" status and the integrated controller may be programmed to suspend die casting operations until the "unloading complete" status is signaled. In addition, the integrated controller 60 may be programmed to operate the pick and place robot 50 as a function of a status of the die casting machine 20. For example, the integrated controller 60 may be programmed to suspend operation of the pick and place robot until the status of the die casting machine indicates a "ready to unload" status.

The integrated controller 60 may also be programmed to operate one or more of the servo-controlled mechanisms as a function of a status of the die casting machine 20. For example, where the servo-controlled mechanism comprises a sprayer assembly, the integrated controller 60 may be programmed to suspend operation of the sprayer assembly until the status of the die casting machine comprises a "ready to spray" status. In the case where the servo-controlled mechanism comprises a molten material ladle, the integrated controller may be programmed to suspend operation of the ladle until the status of the die casting machine comprises a "ready to pour" status.

Thus, the die casting operation of the present invention is executed by utilizing the integrated controller 60 to coordinate the operational parameters of the die casting machine 20, the servo-controlled ladle 30, the servo-controlled sprayer 40, and the pick and place robot 50. As is described in further detail herein with reference to selected the statuses of the different components of the integrated die cast system 10 of the present invention, many of the operational parameters of the die casting machine 20, the servo-controlled ladle 30, the servo-controlled sprayer 40, and the pick and place robot 50 are interdependent.

The programming pendant 70 is coupled to the integrated controller and is arranged to permit a programmer to define the operational parameters of the die casting machine 20, the servo-controlled ladle 30, the servo-controlled sprayer 40, and the pick and place robot 50. Specifically, the programming pendant 70 includes or is coupled to a user interface that provides a representation of each of the operational components of the integrated die cast system 10 and their respective operational parameters. In this manner, a user may program specific operations of the various components and orchestrate specific operational sequences of the components as a whole.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An integrated die cast system comprising:

a die casting machine including a die casting machine controller;

a servo-controlled ladle including a molten material ladle and a servo-motor arranged to cause said ladle to transfer molten material to an injection chamber of said die casting machine;

a servo-controlled sprayer including a sprayer assembly and a servo-motor arranged to orient said sprayer assembly proximate a die cavity of said die casting machine;

a pick and place robot arranged to access a die cavity of said die casting machine;

an integrated controller in communication with said die-casting machine controller, said servo-controlled ladle, said servo-controlled sprayer, and said pick and place robot, wherein said integrated controller is programmed to execute operational parameters of said servo-controlled ladle, execute operational parameters of said servo-controlled sprayer, execute operational parameters of said pick and place robot, execute a die casting operation by coordinating said operational parameters of said die casting machine, said servo-controlled ladle, said servo-controlled sprayer, and said pick and place robot, wherein said operational parameters of said die casting machine, said servo-controlled ladle, said servo-controlled sprayer, and said pick and place robot are interdependent; and a programming pendant coupled to said integrated controller and arranged to permit a programmer to define said operational parameters of said die casting machine, said servo-controlled ladle, said servo-controlled sprayer, and said pick and place robot.

2. An integrated die cast system comprising:

a die casting machine;

a servo-controlled mechanism associated with said die casting machine;

a pick and place robot associated with said die casting machine;

an integrated controller in communication with said die-casting machine, said servo controlled mechanism, and said pick and place robot, wherein said integrated controller is programmed to execute operational parameters of said servo-controlled mechanism, execute operational parameters of said pick and place robot, execute a die casting operation by coordinating said operational parameters of said die casting machine, said servo-controlled mechanism, and said pick and place robot, wherein said operational parameters of said die casting machine, said servo-controlled mechanism, and said pick and place robot are interdependent.

3. An integrated die cast system as claimed in claim 2 wherein said integrated controller is programmed to execute said die casting operation as a function of a status of said servo-controlled mechanism.

4. An integrated die cast system as claimed in claim 3 wherein said status of said servo-controlled mechanism comprises a progressive representation of a task to be completed by said servo-controlled mechanism.

5. An integrated die cast system as claimed in claim 4 wherein said die casting operation is executed upon completion of said task.

6. An integrated die cast system as claimed in claim 4 wherein said die casting operation is executed prior to completion of said task.

7. An integrated die cast system as claimed in claim 3 wherein said servo-controlled mechanism comprises a sprayer assembly and wherein said status of said servo-controlled mechanism comprises a "spray complete" status.

8. An integrated die cast system as claimed in claim 3 wherein said servo-controlled mechanism comprises a molten material ladle and wherein said status of said servo-controlled mechanism comprises a "pour complete" status.

9. An integrated die cast system as claimed in claim 2 wherein said integrated controller is programmed to execute said die casting operation as a function of a status of said pick and place robot.

10. An integrated die cast system as claimed in claim 9 wherein said status of said pick and place robot comprises an "unloading complete" status.

11. An integrated die cast system as claimed in claim 2 wherein said integrated controller is programmed to operate said pick and place robot as a function of a status of said die casting machine.

12. An integrated die cast system as claimed in claim 11 wherein said status of said die casting machine comprises a "ready to unload" status.

13. An integrated die cast system as claimed in claim 2 wherein said integrated controller is programmed to operate said servo-controlled mechanism as a function of a status of said die casting machine.

14. An integrated die cast system as claimed in claim 13 wherein said servo-controlled mechanism comprises a sprayer assembly and wherein said status of said die casting machine comprises a "ready to spray" status.

15. An integrated die cast system as claimed in claim 13 wherein said servo-controlled mechanism comprises a molten material ladle and wherein said status of said die casting machine comprises a "ready to pour" status.

16. An integrated die cast system as claimed in claim 2 further comprising a programming pendant coupled to said integrated controller and arranged to permit a programmer to define said operational parameters of said die casting machine, said servo-controlled mechanism, and said pick and place robot.

17. An integrated die cast system as claimed in claim 2 wherein said die casting machine includes a die casting machine controller and wherein said integrated controller is in communication with said die casting machine controller.

18. An integrated die cast system as claimed in claim 2 wherein said servo-controlled mechanism comprises a molten material ladle and a servo-motor arranged to cause said ladle to transfer molten material to an injection chamber of said die casting machine.

19. An integrated die cast system as claimed in claim 2 wherein said servo-controlled mechanism comprises a sprayer assembly and a servo-motor arranged to orient said sprayer assembly proximate a die cavity of said die casting machine.

20. An integrated die cast system as claimed in claim 2 wherein said servo-controlled mechanism comprises a robot transfer track arranged to move said pick and place robot along a predetermined axis.

* * * * *